Aug. 19, 1947.  E. J. RADWANSKI  2,426,050
PLUNGER TYPE VOLTAGE INDICATOR
Filed May 1, 1944  2 Sheets-Sheet 1
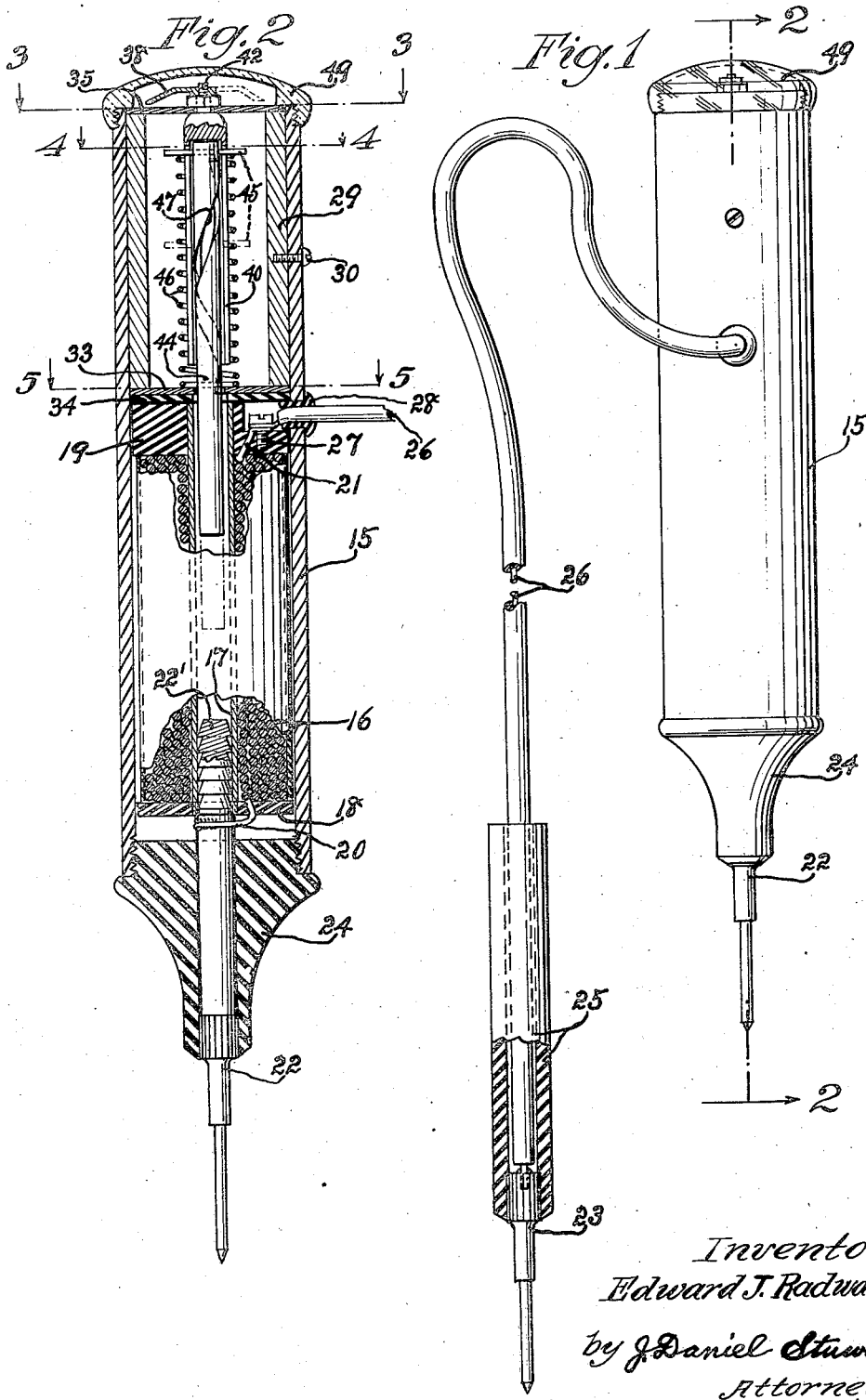
Inventor
Edward J. Radwanski
by J. Daniel Stuwe
Attorney.

Aug. 19, 1947.  E. J. RADWANSKI  2,426,050
PLUNGER TYPE VOLTAGE INDICATOR
Filed May 1, 1944  2 Sheets-Sheet 2
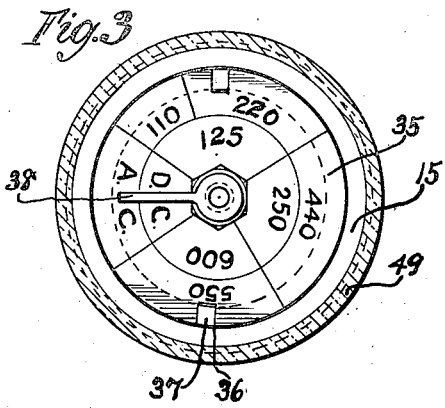
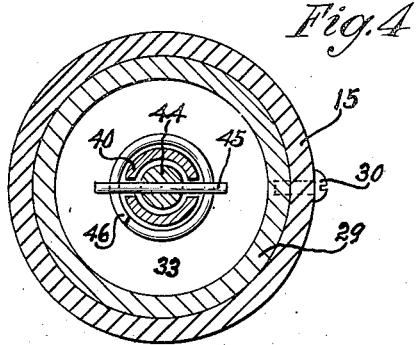
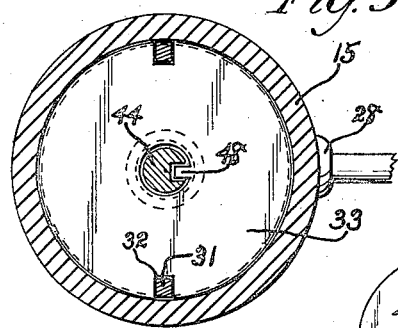
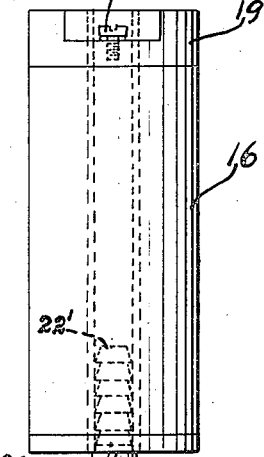
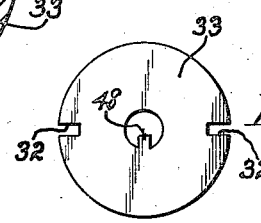
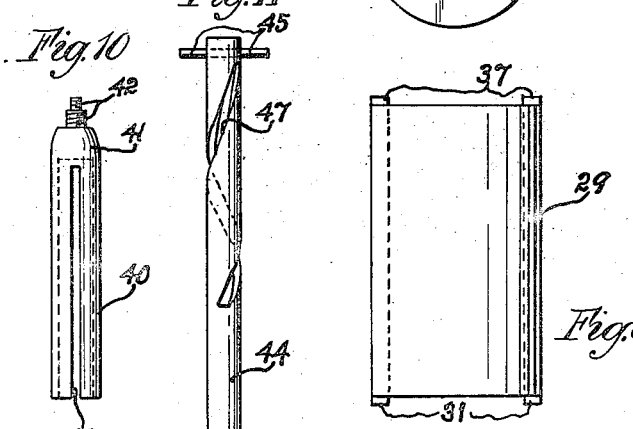
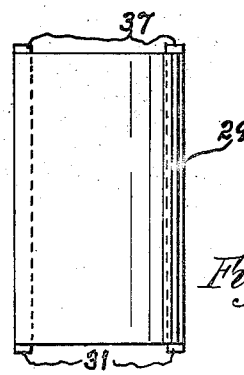
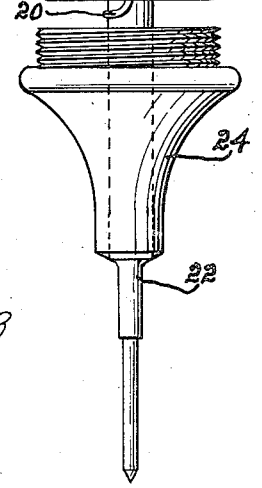
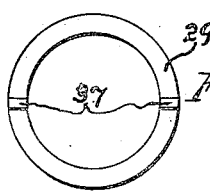
Inventor
Edward J. Radwanski
by J. Daniel Stuwe
Attorney.

Patented Aug. 19, 1947

2,426,050

UNITED STATES PATENT OFFICE 2,426,050

PLUNGER TYPE VOLTAGE INDICATOR

Edward J. Radwanski, Chicago, Ill.

Application May 1, 1944, Serial No. 533,600

5 Claims. (Cl. 171—95)

This invention relates to novel improvements in a voltage indicator.

One of the essential objects of this invention is to provide an improved hand operated device for testing and measuring electric voltages, both A. C. and D. C., and which is very compact and durable in its construction and is very convenient in use.

A more particular object of this invention is to provide an efficient voltage indicator which has one of its tester prongs fixedly mounted at one end of the device, and has only the other tester prong flexibly mounted thereon, while the indicating dial and finger are located at the opposite end of this device, that which extends toward the operator; so that with this testing device the operator needs to manipulate only one flexible lead and its prong with one hand, while he manipulates the device with the other hand, and he can at the same time conveniently read the voltages from the end of the device extending toward him during the testing operation.

These and various other objects and advantages are attained with this invention, as will become apparent from the following description, taken in connection with the accompanying drawings wherein the invention is shown in its preferred form, it being evident that other arrangements and forms of construction may be resorted to for carrying out the objects and purposes of this invention.

In the drawings:

Fig. 1 is a view illustrating this invention in its preferred form of construction.

Fig. 2 is a longitudinal sectional view thereof, taken on the line 2—2 of Fig. 1.

Figs. 3, 4, and 5 are enlarged cross-sectional views, taken respectively, on lines 3—3, 4—4, and 5—5 of Fig. 2.

Fig. 6 is a detail view of the solenoid and associated members carried in the casing.

Fig. 7 is a plan view of the tooth-equipped disk that causes the armature shaft to turn as it reciprocates.

Figs. 8 and 9 are, respectively, a side view and an end view, of the shell that is held stationary in the casing.

Fig. 10 is a view of the slotted sleeve.

Fig. 11 is a view of the armature shaft.

This invention briefly comprises a compact and conveniently operable hand instrument for measuring electric voltages, which includes an electrically actuated member, preferably in the form of a solenoid provided with a movable armature shaft, and wherein the movement of the armature shaft is governed by the voltage applied to the instrument.

My improved voltage indicator, in the form illustrated herein, comprises a casing 15, which has an electrically actuated member 16 mounted therein. Said member 16 is shown in the form of a solenoid, which has a spool 17 therein surrounded by the coil windings of the solenoid, and which includes the end members 18 and 19 of insulating material thru which the ends 20 and 21 of said coil windings extend.

The prods or contact prongs of this voltage indicator include a prong 22 which is fixedly mounted on one end of the casing, and a prong 23 which is flexibly carried by the casing. Said prong 22 preferably has a notched or grooved surface at its end part 22' which is forced with a driving fit into the end of the solenoid spool 17, and said end part 22' has the coil end 20 of the solenoid secured thereto, preferably by the use of solder.

An insulating collar or plug 24 surrounds the prong 22, to insulate the prong from the user's hand, and it is secured into the end of the casing 15, being conveniently threaded therein.

The other prong 23, the flexibly carried prong, is similarly provided with an insulating sleeve 25, for manipulating this prong by hand, and it has an insulated conductor 26 connecting the prong with the end 21 of the solenoid coil, preferably by the use of a tie bolt or screw 27 threaded into the end member 19 of the solenoid. Said conductor 26 extends thru a grommet 28 provided in the casing wall.

This arrangement and construction provides a voltage tester or indicator which has one prong mounted fixedly and held rigidly in place on the tester and which is thus controlled and operated by the hand which holds and manipulates this instrument, and thus thereby leaves only one flexibly or movably mounted prong to be operated by the other hand during the testing operation.

A shell or tubular member 29 is mounted in the casing, being in alinement with the solenoid 16, and is held stationary in position therein by a screw 30. The shell has lugs 31 at one end which engage in notches 32 provided in a washer-like operating member or disk 33, thereby holding the latter against rotation; and said disk is superposed on an insulating washer 34 positioned upon the solenoid 16.

The voltage indicating means herein is mounted on the end of the casing opposite the end having the fixed prong 22 therein, so as to be more readily observed during operation; and said means includes an indicator dial 35 which is mounted across the end of the casing and is held against rotation by peripheral notches 36 engaging on lugs 37 provided at the end of said shell 29. Suitably spaced numbers are provided on the dial, as shown in Fig. 3 of the drawings, to indicate the voltage applied thru the tester prongs to this instrument, the dial being preferably numbered from 110 to 550 volts A. C., and from 125 to 600 volts D. C. An indicating finger 38 is provided to swing upon said dial for indicating the voltage applied to the device.

The means for turning the indicating finger 38 includes a supporting member, which is in the form of a sleeve 40 having a closed top 41 with a stem 42 thereon which extends thru and is rotatable in the dial 35, said finger 38 being secured on the upper end of said stem to turn therewith. This sleeve 40 has a pair of slots 43 extending longitudinally thereof.

This construction includes a movable armature shaft 44 which is reciprocable in the spool 17 of the solenoid 16 and is drawn into the same when the solenoid is energized. Said armature shaft has a pin 45 at its end which is slidable longitudinally of said slots 43 in said sleeve 40 when the armature shaft 44 reciprocates; and a compression spring 46 is mounted around said sleeve and bears on the disk 33 and against said pin 45, for returning the armature shaft from its electrically actuated position to its retracted position, as shown in full lines in the drawings. A partly reciprocated position of the armature shaft is shown in broken lines in Fig. 2, due to an energized solenoid. Said spring 46 is tensioned to offer some resistance to the magnetic pull on the armature shaft 44 by the energized solenoid.

The means provided for turning the indicating finger 38, by the action of the armature shaft 44 during operation of the device, comprises spiral means and a member co-engaged therewith one of which is associated with said shaft and the other is mounted in the casing; and as shown in the drawings this spiral means is in the shape of a flute or spiral groove 47 provided on the armature shaft 44, and the operating member or disk 33 with its tooth 48 which extends into said groove 47, to cooperate therewith for turning said shaft as it reciprocates in the casing.

From the above it becomes apparent that, since the disk 33 is held stationary, whenever the armature shaft reciprocates it is forced to turn or rotate, and while its pin 45 slides in the grooves 43 in the sleeve 40 said sleeve is forced to turn also with the shaft, and indicating finger 38, which is secured on the stem 42 on said sleeve 40, is thus also turned along with said shaft and sleeve whenever the shaft reciprocates, to indicate the voltage applied to the device.

A cap 49 of durable transparent material is secured on the end of the casing 15, to cover and protect the indicating dial 35 and the indicating finger 38.

This device can be held by the operator in one hand, having the fixed prong 22 at the far end in position for use, and the indicating means at the near end conveniently readable, while the other hand can thereby readily manipulate the flexibly carried prong 23.

I claim:

1. An electrical tester comprising a reciprocable member and means for electrically actuating it, a rotatable member mounted to turn on an axis parallel to the axis of the reciprocable member, an indicating finger operatively connected to said rotatable member, and co-engaging and relatively slideable means associated with said members for turning said finger when said reciprocable member reciprocates.

2. An electrical tester comprising a reciprocable member and means for electrically actuating it, an indicating means having a rotatable rigid member mounted to rotate bodily about an axis parallel to the reciprocable member, and means associated with said members to cause a relative rotation and reciprocation of said members whereby said indicating means rotates when said reciprocable member reciprocates, said associated means comprising spiral means and co-engaging relatively slideable means, one of which is associated with one of said members and the other of which is associated with the other of said members.

3. An electrical tester comprising a casing containing electrical means and a shaft mounted to be reciprocated by said electrical means, indicating means including a finger mounted on the casing, rotatable supporting means connected to said finger and mounted to rotate about an axis parallel to the axis of said shaft, and co-engaging and relatively slideable means associated with said shaft and said supporting means for turning said supporting means and said finger about said axis when said shaft is reciprocated.

4. An electrical tester comprising a casing containing a solenoid having a spool therein surrounded by a coil winding, indicating means including a finger movable thereon, a sleeve supporting said finger and being co-axial with the solenoid and its spool, an armature shaft reciprocable into said spool when the solenoid is energized and being also reciprocable in the sleeve, means allowing relative reciprocation by the shaft in the sleeve, a spring for retracting the shaft from the solenoid-actuated to the release position, and spiral means and co-engaging means, one of which means is associated with the shaft and the other means is supported in the casing, whereby the sleeve and the finger are rotated when the shaft reciprocates.

5. In a testing device having a casing containing a solenoid with an armature reciprocable in the solenoid, and carrying an indicating means having a movable finger; the combination therewith of a rigid supporting member for the finger and rotatable about an axis parallel to the armature, and means carried by the casing and the armature to cause bodily relative rotation of the armature and said supporting member with said finger when the armature is reciprocated in the solenoid, and means having relatively slideable parts operatively connected to the supporting member and to the armature to rotate the support with the finger about said axis consonantly with the reciprocation of the armature.

EDWARD J. RADWANSKI.

REFERENCES CITED

The following references are of record in the file of this patent:

UNITED STATES PATENTS

| Number | Name | Date |
| --- | --- | --- |
| 446,494 | Weston | Feb. 17, 1891 |
| 1,707,051 | Colosoff | Mar. 26, 1929 |
| 1,888,906 | Colosoff | Nov. 22, 1932 |
| 2,363,799 | Mahurin | Nov. 28, 1944 |
| 1,834,882 | Vaughn | Dec. 1, 1931 |